United States Patent
Gubba Ravikumar et al.

(10) Patent No.: US 10,381,835 B1
(45) Date of Patent: Aug. 13, 2019

(54) ELECTRIC POWER GENERATOR SELECTION, SHEDDING, AND RUNBACK FOR POWER SYSTEM STABILITY

(71) Applicant: Schweitzer Engineering Laboratories, Inc., Pullman, WA (US)

(72) Inventors: Krishnanjan Gubba Ravikumar, Pullman, WA (US); Benjamin E. Armstrong, Pullman, WA (US); Maaz Syed Muhammad Kazmi, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 65 days.

(21) Appl. No.: 15/893,423

(22) Filed: Feb. 9, 2018

(51) Int. Cl.
*G05B 17/02* (2006.01)
*H02J 3/38* (2006.01)
*G06F 1/26* (2006.01)
*G06F 3/06* (2006.01)

(52) U.S. Cl.
CPC .............. *H02J 3/381* (2013.01); *G05B 17/02* (2013.01)

(58) Field of Classification Search
CPC .. G06F 1/26; G06F 3/0644; H02J 3/14; H04L 67/1044
USPC ................................ 700/287, 291, 295, 297
See application file for complete search history.

(56) References Cited

U.S. PATENT DOCUMENTS

| | | |
|---|---|---|
| 4,349,744 A | 9/1982 | Reuther |
| 4,387,336 A | 6/1983 | Joy |
| 4,829,298 A | 5/1989 | Fernandes |
| 5,006,846 A | 4/1991 | Granville |
| 5,224,011 A | 6/1993 | Yalla |
| 5,341,265 A | 8/1994 | Westrom |
| 5,446,682 A | 8/1995 | Janke |
| 5,498,956 A | 3/1996 | Kinney |
| 5,592,393 A | 1/1997 | Yalla |
| 5,596,492 A | 1/1997 | Divan |
| 5,694,281 A | 12/1997 | Roberts |

(Continued)

OTHER PUBLICATIONS

Saman A. Zonouz and William H. Sanders, A Kalman-based Coordination for Hierarchical State Estimation: Algorithm and Analysis, 41st Annual Hawaii International Conference on System Sciences, Jan. 2008.

(Continued)

*Primary Examiner* — Michael J Brown
(74) *Attorney, Agent, or Firm* — Whitney R. Johnson

(57) ABSTRACT

The present disclosure provides systems and methods for managing an electric power delivery system. The systems and methods may limit generated power of the power delivery system from surpassing a load demand, in order to avoid system instability. The systems and methods may receive an excess generation value and manage generators to runback and/or shed to maintain excess generation below a threshold. The systems and methods may determine a plurality of generator groups for runback. The runback capacity of the generators may be compared against the excess generation. If the excess generation is not greater than the runback capacity, the systems and methods may select generator groups until the runback capacity of the selected groups is greater than the excess generation, and may runback those generators according to runback set points. The unselected generators may continue normal operation to be available for another runback request.

23 Claims, 5 Drawing Sheets

(56) References Cited

U.S. PATENT DOCUMENTS

| | | | |
|---|---|---|---|
| 5,703,745 A | 12/1997 | Roberts | |
| 5,731,943 A | 3/1998 | Roberts | |
| 5,973,481 A | 10/1999 | Thompson | |
| 6,028,754 A | 2/2000 | Guzman | |
| 6,236,949 B1 | 5/2001 | Hart | |
| 6,265,881 B1 | 7/2001 | Meliopoulos | |
| 6,285,917 B1 | 9/2001 | Sekiguchi | |
| 6,341,055 B1 | 1/2002 | Guzman | |
| 6,356,421 B1 | 3/2002 | Guzman | |
| 6,356,471 B1 | 3/2002 | Fang | |
| 6,411,865 B1 | 6/2002 | Qin | |
| 6,442,010 B1 | 8/2002 | Kasztenny | |
| 6,446,682 B1 | 9/2002 | Viken | |
| 6,603,298 B2 | 8/2003 | Guzman | |
| 6,608,742 B2 | 8/2003 | Schweitzer | |
| 6,662,124 B2 | 12/2003 | Schweitzer | |
| 6,694,270 B2 | 2/2004 | Hart | |
| 6,757,146 B2 | 6/2004 | Benmouyal | |
| 6,839,210 B2 | 1/2005 | Roberts | |
| 6,845,333 B2 | 1/2005 | Anderson | |
| 6,946,753 B2 | 9/2005 | Kernahan | |
| 7,072,744 B2 | 7/2006 | Kuwabara | |
| 7,116,010 B2 | 10/2006 | Lasseter | |
| 7,196,884 B2 | 3/2007 | Guzman | |
| 7,233,082 B2 | 6/2007 | Furuya | |
| 7,319,576 B2 | 1/2008 | Thompson | |
| 7,356,422 B2 | 7/2008 | Schweitzer | |
| 7,457,688 B2 | 11/2008 | Szepek | |
| 7,480,580 B2 | 1/2009 | Zweigle | |
| 7,570,469 B2 | 8/2009 | Guzman | |
| 7,582,986 B2 | 9/2009 | Folkers | |
| 7,630,863 B2 | 12/2009 | Zweigle | |
| 7,635,967 B2 | 12/2009 | Loucks | |
| 7,660,088 B2 | 2/2010 | Benmouyal | |
| 7,710,693 B2 | 5/2010 | Guzman | |
| 7,761,910 B2 | 7/2010 | Ransom | |
| 7,856,327 B2 | 12/2010 | Schweitzer | |
| 7,903,381 B2 | 3/2011 | Fischer | |
| 7,930,117 B2 | 4/2011 | Guzman-Casillas | |
| 8,082,367 B2 | 12/2011 | Etheridge | |
| 8,346,402 B2 | 1/2013 | Guzman-Casillas | |
| 8,410,633 B2 | 4/2013 | Batzler | |
| 8,560,255 B2 | 10/2013 | Elwarry | |
| 8,965,592 B2 | 2/2015 | Manson | |
| 9,008,850 B2 | 4/2015 | Manson | |
| 9,528,496 B2 | 12/2016 | Mayer | |
| 9,798,342 B2 | 10/2017 | Gubba Ravikumar | |
| 9,906,041 B2 | 2/2018 | Ravikumar | |
| 9,912,158 B2 | 3/2018 | Ravikumar | |
| 2004/0021470 A1 | 2/2004 | Adams | |
| 2004/0027748 A1 | 2/2004 | Kojovic | |
| 2004/0059469 A1 | 3/2004 | Hart | |
| 2004/0138834 A1 | 7/2004 | Blackett | |
| 2004/0252525 A1 | 12/2004 | Aldridge | |
| 2005/0144437 A1 | 6/2005 | Ransom | |
| 2006/0224336 A1 | 10/2006 | Petras | |
| 2006/0259255 A1 | 11/2006 | Anderson | |
| 2007/0086134 A1 | 4/2007 | Zweigle | |
| 2007/0100504 A1 | 5/2007 | Moxley | |
| 2007/0103004 A1 | 5/2007 | Chou | |
| 2007/0219755 A1 | 9/2007 | Williams | |
| 2007/0222294 A1 | 9/2007 | Tsukida | |
| 2007/0239372 A1 | 10/2007 | Schweitzer | |
| 2008/0040296 A1 | 2/2008 | Bridges | |
| 2008/0204044 A1 | 8/2008 | Ponnaluri | |
| 2008/0232005 A1 | 9/2008 | Kuehnle | |
| 2008/0281540 A1 | 11/2008 | Zweigle | |
| 2009/0021082 A1 | 1/2009 | Loucks | |
| 2009/0079266 A1 | 3/2009 | McNamara | |
| 2009/0085407 A1 | 4/2009 | Venkatasubramanian | |
| 2009/0088989 A1 | 4/2009 | Guzman | |
| 2009/0088990 A1 | 4/2009 | Schweitzer | |
| 2009/0089608 A1 | 4/2009 | Guzman | |
| 2009/0091867 A1 | 4/2009 | Guzman | |
| 2009/0099798 A1 | 4/2009 | Gong | |
| 2009/0125158 A1 | 5/2009 | Schweitzer | |
| 2009/0198383 A1 | 8/2009 | Gardner | |
| 2009/0254655 A1 | 10/2009 | Kidwell | |
| 2009/0276173 A1 | 11/2009 | Wang | |
| 2010/0002348 A1 | 1/2010 | Donolo | |
| 2010/0104847 A1 | 4/2010 | Ciavatta | |
| 2010/0114390 A1 | 5/2010 | Stevenson | |
| 2010/0145536 A1 | 6/2010 | Masters | |
| 2010/0152910 A1 | 6/2010 | Taft | |
| 2010/0198423 A1 | 8/2010 | Hirst | |
| 2011/0004324 A1 | 1/2011 | Bickel | |
| 2011/0022734 A1 | 1/2011 | Etheridge | |
| 2011/0062708 A1 | 3/2011 | Prochaska | |
| 2011/0068576 A1 | 3/2011 | Meier | |
| 2011/0077885 A1 | 3/2011 | Zweigle | |
| 2011/0190958 A1 | 8/2011 | Hirst | |
| 2011/0213606 A1 | 9/2011 | Seaman | |
| 2011/0251732 A1 | 10/2011 | Schweitzer | |
| 2011/0298286 A1 | 12/2011 | Batzler | |
| 2012/0226386 A1 | 9/2012 | Kulathu | |
| 2013/0018521 A1* | 1/2013 | Manson | H02J 3/14 700/297 |
| 2013/0035800 A1* | 2/2013 | Kulathu | H02J 3/14 700/295 |
| 2014/0249686 A1 | 9/2014 | Brainard | |
| 2015/0222123 A1 | 8/2015 | Manson | |
| 2015/0244170 A1 | 8/2015 | Bartlett | |
| 2017/0270414 A1 | 9/2017 | Ignatova | |

OTHER PUBLICATIONS

ABB: Improved Power System Performance through Wide Area Monitoring, Protection, and Control, Jan. 2004.

ABB, Wide Area Measurement, Monitoring, Protection and Control Industrial IT for Energy System Operation—Jan. 2003.

Y. Wu, M. Kezunovic, Automatic Simulation of IED Measurements for Substation Data Integration Studies, Power Engineering Society General Meeting, Jun. 12-16, 2005.

R.A. Walling, N.W. Miller, Distributed Generation Islanding-Implications on Power System Dynamic Performance, IEEE Power Enginnering Society Summer Meeting vol. 1, Jul. 25, 2002.

M. Ezzt, M.I. Marei, M. Abdel-Rahman, M.M. Mansour, A Hybrid Strategy for Distributed Generators Islanding Detection, IEEE PES Power Africa 2007 Conference and Exposition Johannesburg, South Africa, May 16-20, 2007.

Jun Yin, Liuchen Chang, Chris Diduch, Recent Developments in Islanding Detection for Distributed Power Generation, IEEE Power Engineering, Jul. 2004.

Xiaoming Wang, Vijay Vittal, System Islanding Using Minimal Cutsets with Minimum Net Flow, IEEE Power Systems Conference and Exposition, Oct. 2004.

Dongchen Hu, Vaithianathan Venkatasubramanian, New Wide Area Algorithms for Detection and Mitigation of Angle Instability Using Synchrophasors, IEEE Power Engineering Society General Meeting, Jun. 2007.

Robert J. Best, D. John Morrow, David J. McGowan, Peter A. Crossley, Synchronous Islanded Operation of a Diesel Generator, IEEE Transactions on Power Systems, vol. 22, No. 4, Nov. 2007.

Olof Samuelsson, Helga Johannsdottir, Nils Gustavsson, Thorhallur Hrafnsson, Daniel Karlsson, Mike Kockott, Johan Salj, Arve Sollie, Power System Damping in Iceland Based on Phasor Measurements, Jul. 2, 2006.

Michael J. Thompson, Fundamentals and Advancements in Generator Synchronizing Systems, Dec. 9, 2010.

Michael J. Thompson, New Developments in Generator Synchronizing Systems, Feb. 10, 2011.

PCT/US2019/014310 Patent Cooperation Treaty International Search Report and Written Opinion of the International Searching Authority, dated Mar. 26, 2019.

* cited by examiner i – Current filled field in SET.
Always the last filled field.

Evaluation Logic

N – Number of objects in set
1 – New Set
2 – Saved Best Set

ELECTRIC POWER GENERATOR SELECTION, SHEDDING, AND RUNBACK FOR POWER SYSTEM STABILITY

TECHNICAL FIELD

The present disclosure relates to systems and methods for controlling and protecting an electric power delivery system and, more particularly, to generation shedding and runback systems and methods to limit actions that result in over-shedding of generation and to increase plant survivability during runback events.

BRIEF DESCRIPTION OF THE DRAWINGS

Non-limiting and non-exhaustive embodiments of the disclosure are described herein, including various embodiments of the disclosure with reference to the figures listed below.

Figure 1:
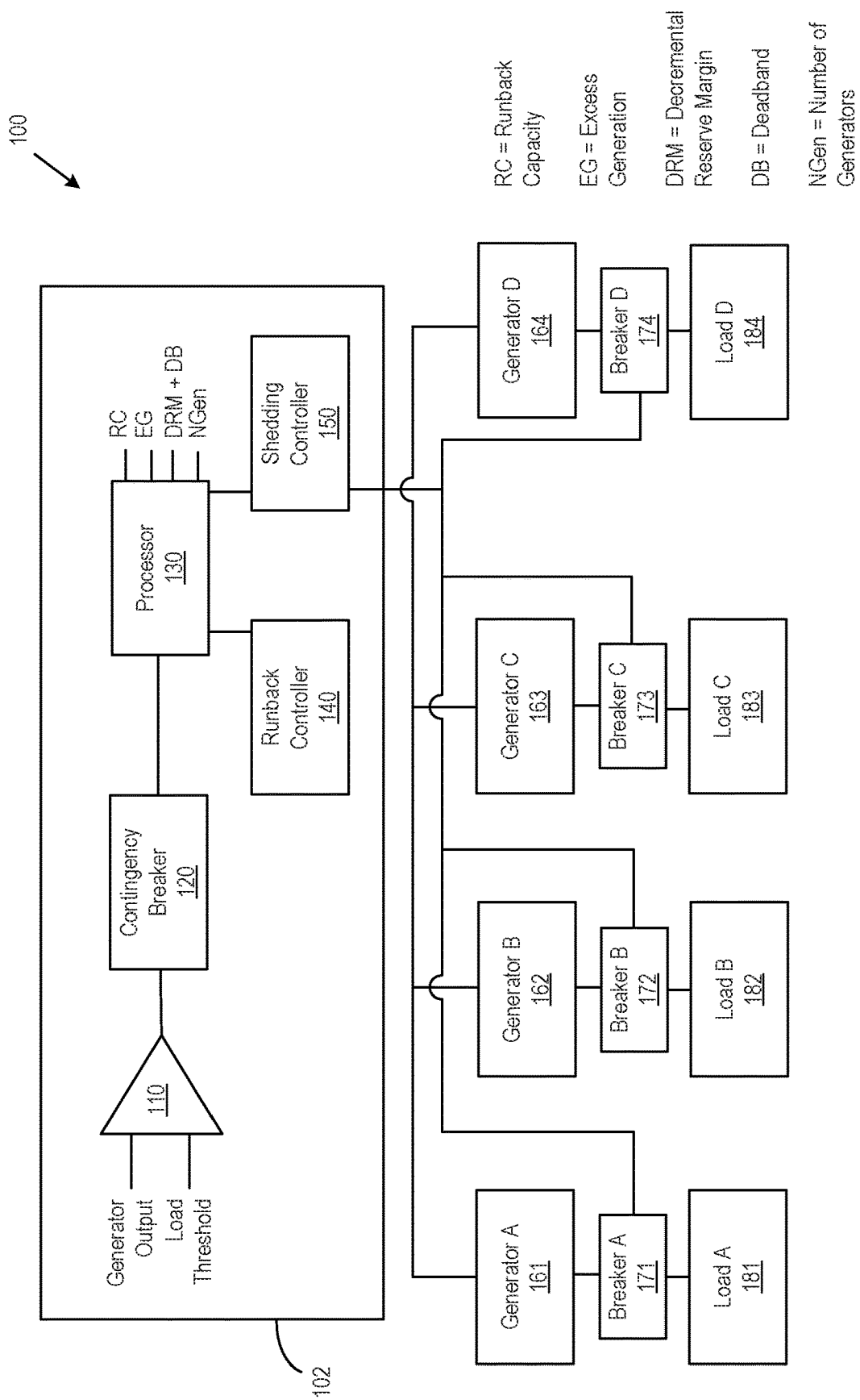
FIG. 1 is a simplified diagram of an electric power system that includes an intelligent electronic device (IED) for generator shedding and runback, according to one embodiment of the present disclosure.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

This disclosure provides methods and systems to improve likelihood of avoiding an action to cause over-shedding of generation, while ensuring the stability of a power plant.

Management of electrical power generation and distribution systems may include balancing electrical power generation with varying load thresholds or load demands. When the electrical power being generated is greater than the load threshold, the electrical power generation and distribution system may lose stability and/or incur other problems. To avoid disturbances when the generated power is greater than the load threshold, the generated power must decrease. Currently, there are two common approaches to reducing generator power: the first is to shed generators (i.e. open breakers that couple generators to respective loads), and the second is to runback or rundown the generators (i.e. reduce the power at which the generators are run).

The approach of shedding generators during an overproduction of power has traditionally been performed according to priority selection. For example, a set of electrical power generators may comprise three generators. The first generator may produce 40 MW of power and have a priority of three. The second generator may produce 30 MW of power and have a priority of two. The third generator may produce 160 MW of power and have a priority of one. The power system may request that the power output be reduced by 70 MW. According to priority selection, the third generator would be selected for shedding. Often when an electrical power system uses priority selection for generator shedding, over-shedding may occur (as in this example).

The approach of running back power generators during an overproduction condition may reduce over-shedding. The power system may select a single generator to runback when there is a request from the electrical power system to reduce the power output. If the runback selection is based on priority, the same generator may be used for runback several times, and the generator may wear down over time. Typically, power systems operate at too high of a frequency for corrective feedback. If only one generator is used for runback, the request to runback relies on a single controller or speed governor. If the controller or speed governor is corrupted, wears out, or breaks, the request for runback may not be completed and severe disruptions in the power system may occur (such as a blackout).

In order to avoid relying on a single generator for runback, another approach is to runback each generator in the power system proportionally. When each generator is runback proportionally, if one generator has a faulty controller or speed governor, the other generators may still be able to complete at least a portion of the runback request and thereby avoid a severe disruption in the power system. However, electric power generators generally have a settling time between runback requests, on the order of a few seconds. If every generator in the power system is occupied with completing a first runback request when a second runback request is sent, the second runback request may not be completed and severe disruptions may occur.

The present disclosure provides systems and methods that may improve plant survivability by allowing a power system to complete back-to-back runback requests. Specifically, the present disclosure provides systems and methods for grouping generators into unique sets. A set of generators may complete a runback request while other sets remain operational or otherwise available for further runback requests. The methods of the present disclosure may also allow for generator shedding to be performed optimally and simultaneously with grouped runback, such that generator shedding targets may be closely approximated.

Additional details and examples are provided with reference to the figures below. Generally speaking, the systems and methods disclosed herein may be adapted to interface with or be included as part of a protection element or protection ecosystem, such as a power system protection relay. Such protection devices may be configured to communicate with, control, operate, energize, de-energize, and/or disengage one or more power system components and provide an indication of where a potential fault has occurred. Protection relays may be installed in electric power transmission and distribution facilities to detect overloads, short circuits, and other fault conditions.

Many embodiments of a protective relay include electronic devices employing Field Programmable Gate Arrays (FPGAs), microcontrollers, CPUs, A/D converters, electronic displays, communication ports, and other electronic devices and systems to digitize power system current and/or voltage measurements, and process data associated with the digitized currents and voltages according to various algorithms and/or digital filters. A protective relay may be configured to make protection decisions based on data associated with a digitized power system's currents and/or voltages, and may communicate decisions made by a protective relay to an appropriate system or personnel, and/or may otherwise cause a suitable response to the digitized power system's currents and/or voltages.

An intelligent electronic device (IED), which may be used for monitoring, protecting, and/or controlling industrial and utility equipment, such as in electric power delivery systems, may include system components to implement a method for managing generator groups of an electric power delivery system using the group equal percentage runback and optimal generator shedding processes described herein.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

As used herein, the term IED may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term IED may be used interchangeably to describe an individual IED or a system comprising multiple IEDs.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special-purpose processing device, such as an ASIC, PAL, PLA, PLD, CPLD, FPGA, or other customized or programmable device. The computer may also include a computer-readable storage device, such as non-volatile memory, static RAM, dynamic RAM, ROM, CD-ROM, disk, tape, magnetic, optical, flash memory, or other computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated alternating current (AC) power lines, physical media transfer, wireless radio links, and/or other data transmission "wires." The network may encompass smaller networks and/or be connectable to other networks through a gateway or similar mechanism.

Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

FIG. 1 is a simplified diagram of one embodiment of a power system 100 that includes an IED 102, generators 161, 162, 163, 164, breakers 171, 172, 173, 174, and loads 181, 182, 183, 184. In a power system (such as the power system 100 of FIG. 1), balancing generated power with a load threshold or load demand is desirable in order to avoid disruptions in delivery of power. It is therefore desirable to decrease the generated power if the generated power is greater than the load threshold. The power system 100 may decrease the generated power by shedding and/or running back one or more of the generators 161-164.

According to one embodiment, the IED 102 of the power system 100 may comprise a comparator 110, a contingency breaker 120, a processor 130, a runback controller 140, and a shedding controller 150. The IED 102 may be coupled to the generators 161-164 and breakers 171-174 of the power system 100 by coupling the runback controller 140 to the generators 161-164 and the shedding controller 150 to the breakers 171-174.

According to FIG. 1, the breakers 171-174 may couple or de-couple the generators 161-164 to the loads 181-184. Specifically, the breakers 171-174 allow power from the generators 161-164 to be delivered to the loads 181-184 if the breakers 171-174 are closed, and do not allow power to be delivered to the loads 181-184 if the breakers 171-174 are opened. The breakers 171-174 may be controlled independently or collectively by the shedding controller 150 of the IED 102.

The generators 161-164 may each have a runback capability, where the power at which the generators 161-164 operate may be controlled by the runback controller 140 of the IED 102. For example, if a first generator 161 is operating at 150 MW and the runback controller 140 sends a command to the first generator 161 to decrease the output to 120 MW, the first generator 161 may respond to the runback request by decreasing the power of operation until the desired output is reached. As illustrated in this example, the generators 161-164 may be controlled independently by the runback controller 140 of the IED 102.

The processor 130 of the IED 102 may send commands to the runback controller 140 and/or the shedding controller 150 after determining an appropriate action for reducing power. According to FIG. 1, the processor 130 receives inputs that may include a signal from the contingency breaker 120, the runback capacity (RC) of the generators 161-164, the excess generation (EG) on the power system 100, the number of generators (NGen), and the sum of the decremental reserve margin (DRM) and deadband (DB). The DRM may be defined as the ability of the generators 161-164 to reject a load within a given frequency limit, and the DB may be used to create an allowed over-shed in order to reduce the number of generators shed.

The comparator 110 of the IED 102 may receive input indicating the generator output (or generator power production) and input indicating the load threshold. Further, the comparator 110 may determine if the generator output has a greater magnitude than the load threshold. If the magnitude of the generator output is greater than the load threshold, the comparator 110 may send a signal to the contingency breaker 120 to allow the processor 130 to perform programmed computations and send commands to the runback controller 140 and shedding controller 150. According to various embodiments, the comparator 110 may pass an analog or digital signal or series of signals and/or outputs to the contingency breaker 120 or directly to the processor 130.

In one example, the comparator 110 is a differentiator, and the output of the comparator 110 is the EG (the difference between the generator output and the load threshold). According to the example, the contingency breaker 120 receives the EG from the comparator 110, and determines if the EG is large enough for generator shedding or generator runback. The contingency breaker 120 may determine if the EG is sufficiently large by comparing the EG to a value defined by the user(s) or the power system 100. If the magnitude of the EG is sufficiently large, the contingency breaker 120 may close, and the EG may pass to the processor 130. Upon receiving the EG, the processor 130 may perform programmed computations and send commands to the runback controller 140 and shedding controller 150 to reduce generation as appropriate to stabilize the power system 100.

In another example, the EG is determined independently of the comparator 110. According to the example, the comparator 110 may compare the generator output to the load threshold, and output a binary value/command directly to the processor 130. If the generator output is greater than the load threshold, the binary value may be a command for the processor 130 to perform programmed computations and send commands to the runback controller 140 and shedding controller 150. Alternatively, the comparator 110 may pass a binary value to the contingency breaker 120, and the contingency breaker 120 may receive the EG from a source other than the comparator 110. The binary value may be a command to allow the contingency breaker 120 to compare the EG to a value defined by the user(s) or the power system 100. If the contingency breaker 120 determines that the EG is sufficiently large, the contingency breaker may pass the EG to the processor 130 along with a command to perform programmed computations and send commands to the runback controller 140 and shedding controller 150.

The processor 130 may determine whether to shed generators 161-164, runback generators 161-164, or perform a combination of the two. Further, the processor 130 may determine how many generators 161-164 to shed, or how much runback is desirable. In one embodiment, the shedding controller 150 determines which generators 161-164 to shed. In an alternative embodiment, the processor 130 determines which generators 161-164 to shed, and the shedding controller 150 manipulates the signals from the processor 130 such that the signals can trip selected breakers 171-174. In one embodiment, the runback controller 140 determines which generators 161-164 to runback as well as the amount that each is runback. In an alternative embodiment, the processor 130 determines which generators 161-164 to runback as well as the amount that each is runback, and the runback controller 140 manipulates the signals from the processor 130 such that the signals can control the power at which the generators 161-164 operate.

The runback controller 140 may control the generators 161-164 collectively, such that each generator 161-164 is commanded to runback a proportional amount. For example, each generator 161-164 may have a runback capacity ($RC_g$), and the sum of the runback capacities ($RC_g$) of the generators 161-164 (RC) may be measured. The processor 130 of the IED 102 may request that 150 MW be runback. The first two generators 161, 162 may each have a current output of 100 MW and the last two generators 163, 164 may each have a current output of 45 MW. Further, the first two generators 161, 162 may each have a runback capacity ($RC_g$) of 50 MW, and the last two generators 163, 164 may each have a runback capacity ($RC_g$) of 25 MW. The collective runback capacity (RC) in this example would be 150 MW. Since the requested runback amount (150 MW) is less than or equal to RC (150 MW), the runback controller 140 may command the first two generators 161, 162 to runback by 50 MW each, and the last two generators 163, 164 to runback by 25 MW each.

The shedding controller 150 may control the breakers 171-174 collectively, such that multiple generators 161-164 may be shed (de-coupled from their respective loads 181-184) at a time. For example, each generator 161-164 may have a current output of 100 MW, where the total output is 400 MW. The processor 130 of the IED 102 may request that 200 MW be shed, and the shedding controller 150 may send a shed command for the first two breakers 171, 172 to de-couple the first two generators 161, 162 from their respective loads 181, 182, thereby shedding 200 MW.

Another possibility is that the processor 130 may request that some generators 161-164 be shed and others be runback. For example, the processor 130 may request that 250 MW be dropped. According to the example, the current output of the power system 100 may be 290 MW, where the first two generators 161, 162 each have a current output of 100 MW, and the last two generators 163, 164 each have a current output of 45 MW. Further, the RC of the power system 100 may be 210 MW, where the first two generators 161, 162 each have an $RC_g$ of 80 MW, and the last two generators 163, 164 each have an $RC_g$ of 25 MW. In the example, the processor 130 may send a command to the shedding controller 150 to shed 90 MW and another command to the runback controller 140 to runback 160 MW. Accordingly, the processor 130 and/or the shedding controller 150 may select the last two generators 163, 164 to shed, and the shedding controller 150 may send commands to the corresponding breakers 173, 174 to open, thereby shedding 90 MW. Further, either the processor 130 or the runback controller 140 may select the first two generators 161, 162 to each runback 80 MW, and the runback controller 140 may send the command to runback, thereby dropping 160 MW. In this example, the decrease in power from shedding and runback is the requested 250 MW.

According to various embodiments, either the processor 130 or the runback controller 140 may group generators 161-164 into sets or groups, such that one or more groups can be selected for runback while one or more other groups maintain present operation (e.g., status quo operation) to be available for future runback requests. Also, the processor 130 or the shedding controller 150 may select generators 161-164 according to an optimal selection process such that the amount of power that is shed approximates the requested shedding amount.

Figure 2:
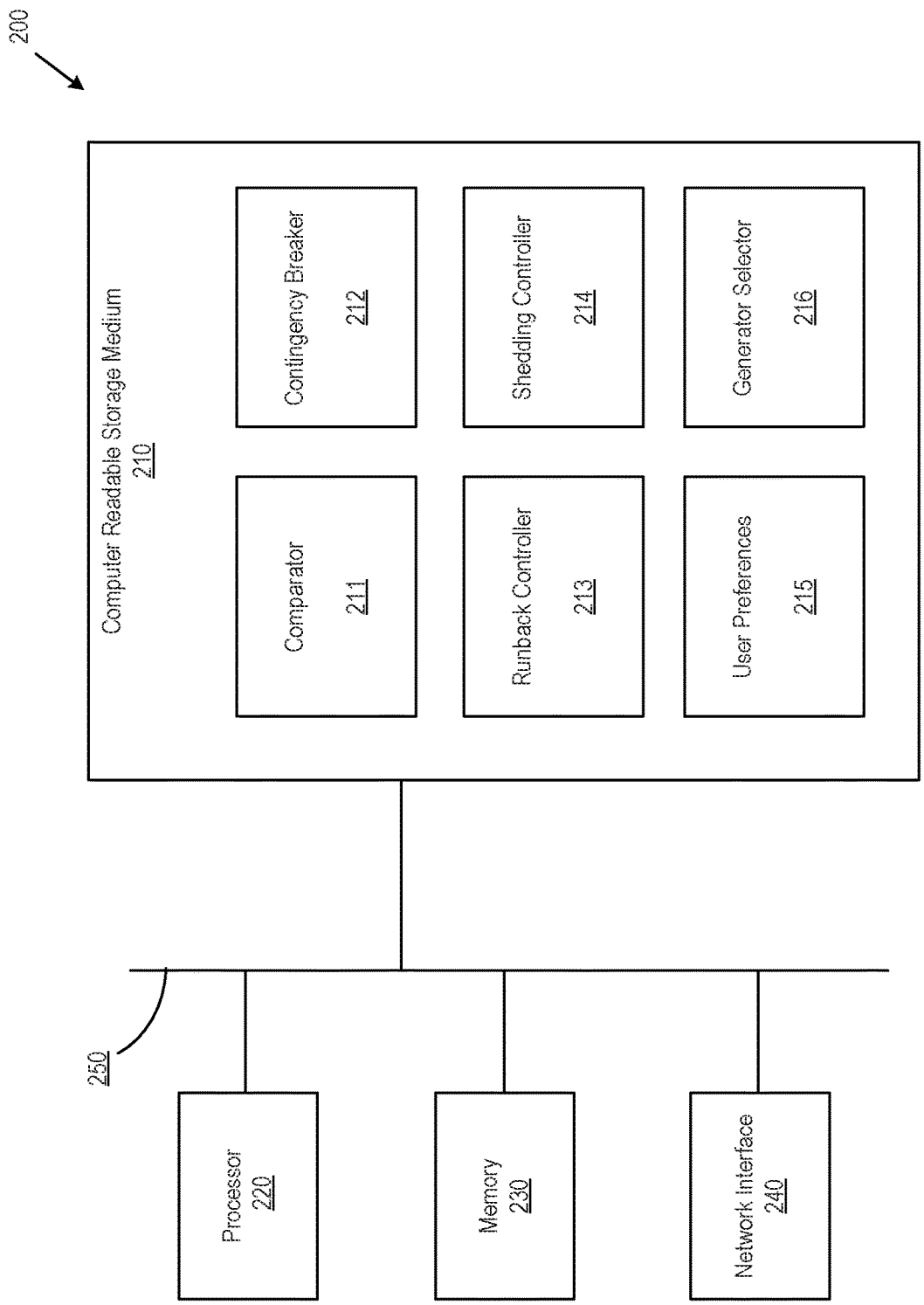
FIG. 2 is a functional block diagram of a system to manage power reduction in a power system, according to one embodiment.

FIG. 2 illustrates a functional block diagram of a system to manage power reduction in a power system, according to one embodiment. The system may comprise an IED or other computing device, and more specifically a power controller 200 to manage power reduction in a power system. FIG. 2 illustrates components of the power controller 200 that may be used to implement a process for reducing the EG in a power system. In a power system (such as the power system 100 of FIG. 1), balancing generated power with a load threshold or load demand is desirable in order to avoid disruptions in delivery of power. It is therefore desirable to decrease the generated power if the generated power is greater than the load threshold (i.e. if the EG is sufficiently large). The power controller 200 may interface with generators and/or breakers to reduce generated power by shedding and/or running back generators. The power controller 200 may group generators into sets or groups, such that one or more groups can be selected by the power controller 200 for runback while one or more other groups maintain present operation (e.g., status quo operation) to be available for future runback requests.

Referring to FIG. 2, the power controller 200 may include a computer-readable storage medium 210, a processor 220, memory 230, a network interface 240, and a bus 250 to interconnect the components. In various embodiments, the processor 220 may perform tasks such as computing, compiling, and/or executing computer executable instructions. The network interface 240 may communicate with various breakers, generators, loads, human readable interfaces, utility power lines, power sensors, and/or external or internal processors or IEDs.

The memory 230 and/or the computer-readable storage medium 210 may be any piece of hardware capable of storing information such as data, computer programs, and/or other suitable information. The memory 230 may include volatile memory and/or non-volatile memory, and may be fixed or removable. The memory 230 may include RAM, ROM, a hard drive, a flash memory, a thumb drive, an optical disk, a magnetic tape, or some combination of the above. In one embodiment, the memory 230 may be used to store instructions to be executed by the processor 220.

The computer-readable storage medium 210 may be a non-transitory memory device, according to one embodiment, and may include any number of modules (e.g., 211-216 described below) for performing tasks to control or manage generator power. In some embodiments, one or more of the modules may be implemented in hardware, firmware, and/or software. In some embodiments, one or more of the modules may be implemented in a cloud-based or remote location and interface via a network interface, such as the network interface 240 of the power controller 200.

The computer-readable storage medium 210 may comprise various modules, including a comparator 211, a contingency breaker 212, a runback controller 213, a shedding controller 214, and/or a generator selector 216. According to various embodiments, the contingency breaker 212 may be a command or series of commands to the processor 220 to perform computations from the generator selector 216 and/or the runback controller 213 and shedding controller 214. The computer-readable storage medium 210 may also include user preferences 215 and other data, which may be used and/or generated by the various modules.

In one embodiment, the comparator 211 may receive and compare the generator output and load threshold. If the generator output is lower than the load threshold, the comparator 211 may send a first signal to the contingency breaker 212. Alternatively, if the generator output is greater than the load threshold, the comparator 211 may send a second signal to the contingency breaker 212. If the contingency breaker 212 receives the second signal from the comparator 211, it may trip based on user preferences 215 among other factors. The user preferences 215 may include pre-determined criteria specifying conditions for when the contingency breaker 212 should trip. When tripped, the contingency breaker 212 may output commands or signals to the generator selector 216 and/or the runback controller 213 and shedding controller 214. Alternatively, if the contingency breaker 212 receives the first signal from the comparator 211, it may ignore the generator selector 216 and/or the runback controller 213 and shedding controller 214. In various embodiments, the first signal from the comparator 211 may be a null signal or an absence of a signal.

In another embodiment, the computer-readable storage medium 210 may not include a contingency breaker 212. The comparator 211 may receive and compare the generator output and load threshold, and output a signal or a command directly to the processor 220. For example, if the generator output is lower than the load threshold, the comparator 211 may output a command to the processor 220 to ignore the generator selector 216 and/or the runback controller 213 and shedding controller 214. Further, according to the embodiment, if the generator output is greater than the load threshold, the comparator 211 may output a command to the processor 220 to perform computations from the generator selector 216 and/or the runback controller 213 and shedding controller 214.

In another embodiment, the comparator 211 may receive and measure the difference between the generator output and load threshold to obtain the EG. According to the embodiment, the comparator 211 may then pass the EG to the contingency breaker 212, and the contingency breaker 212 may determine whether to send commands to the processor 220 to perform computations from the generator selector 216 and/or the runback controller 213 and shedding controller 214. The contingency breaker 212 may compare the EG from the comparator 211 against a user-defined constant or error tolerance threshold and thereby determine whether to send commands to the processor 220 or remain idle. In one embodiment, the contingency breaker 212 receives the user-defined constant or error tolerance threshold from the user preferences 215.

The generator selector 216 may determine how the power controller 200 controls or otherwise manages external generators and/or external generator breakers to reduce generator power. Specifically, the generator selector 216 may determine whether to reduce generator power by shedding generators, by running back generators, or by a combination of the two, and also how much generated power to shed and/or runback. Further, according to one embodiment, the generator selector 216 may group generators into sets or groups, such that one or more groups can be selected for runback while one or more other groups maintain present operation (e.g., status quo operation) to be available for future runback requests. The generator selector 216 may further select generators for shedding according to an optimal selection process such that the amount of power that is shed approximates the requested shedding amount. In various embodiments, the generator selector 216 may send commands to the runback controller 213 and/or the shedding controller 214 for implementation. The runback controller 213 may then prepare appropriate signals to communicate with and control external generators or generator-specific hardware or software. Also, the shedding controller 214 may then prepare appropriate signals to communicate with and control external breakers.

In one embodiment, the generator selector 216 determines whether to runback, shed generators, and/or perform a combination of runback and shedding. The generator selector 216 may further determine how much power to shed and/or runback. The runback controller 213 determines the groups or sets of generators for runback, such that one or more groups can be selected for runback while one or more other groups maintain present operation to be available for future runback requests. The runback controller 213 may also determine how much each generator in an active group or set is to be runback. The shedding controller 214 may determine a group of generators to shed according to an optimal selection process. The runback controller 213 may also prepare appropriate signals to communicate with and control external generators or generator-specific hardware or software. The shedding controller 214 may also prepare appropriate signals to communicate with and control external breakers.

In various embodiments, the generator selector 216, the runback controller 213, and/or the shedding controller 214 may receive and/or utilize data from the user preferences 215. The user preferences 215 may include data pertinent to the selection of external generators for shedding or runback. For example, in one embodiment the user preferences 215 may include a list of generators that do not have a capability to be runback. For example, the generators that belong to the list of the user preferences 215 would not be considered for runback. In another embodiment, the user preferences 215 may include a list of generators that are deemed preferably unavailable from shedding by the user. According to the embodiment, the generators that belong to the list of the user preferences 215 would not be considered for shedding. In other embodiments, the user preferences 215 may specify weightings, scores, or the like for generator shedding and/or runback. The user preferences 215 may also specify conditions for a fault, such as for tripping the contingency breaker 212. For example, the user preferences 215 may specify a magnitude of EG at which a fault is found. As another example, the user preferences 215 may specify a differential between EG and DRM and/or DB at which a fault is determined present.

Figure 3:
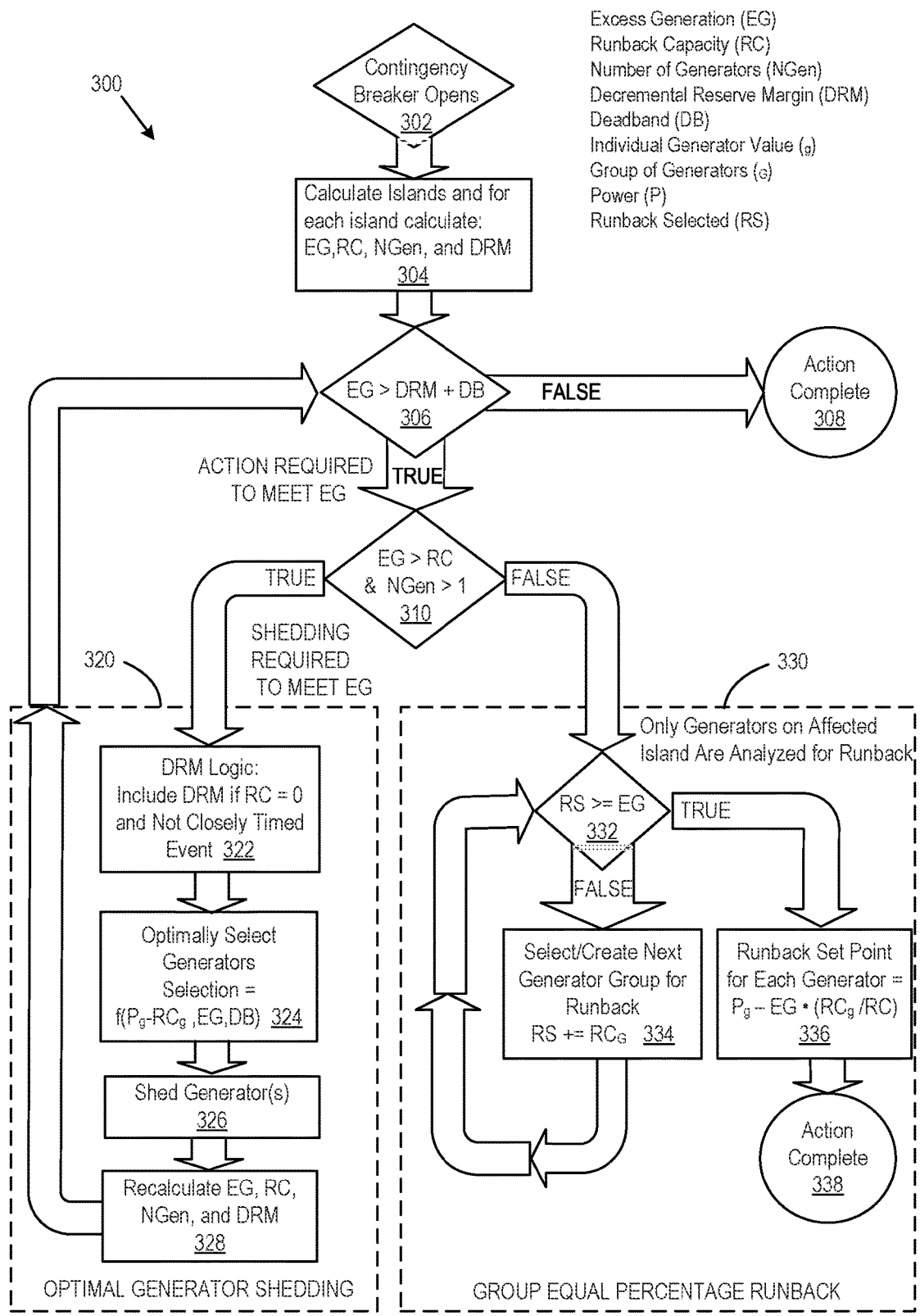
FIG. 3 is a flow chart for an optimal generator shedding and runback control process, according to one embodiment.

FIG. 3 is a flow chart of a process 300 for optimal generator shedding and runback control. In a power system (such as the power system 100 of FIG. 1), it is highly desirable to balance the generated power with the load threshold or load demand in order to avoid disruptions in delivery of power. It is therefore desirable to decrease the generated power if the generated power is greater than the load threshold. The process 300 of FIG. 3 is a method for reducing excess power generation on a power system. The process 300 may receive information from loads, generators, and/or breakers of a power system (such as the power system 100 of FIG. 1), and output information to control generators and/or breakers of the power system. Specifically, the process 300 may determine whether there is an excess of generator power and subsequently select an approach to reduce generator power production. The process 300 may reduce generator power production by shedding generators, by running back generators, or by a combination of the two. Further, the process 300 may determine which generators to shed through an optimal generator shedding process 320 and/or similarly which generators to runback through a group equal percentage runback process 330.

The process 300 of FIG. 3 may be implemented on or by an IED or other computing device (such as the power controller 200 of FIG. 2). According to various embodiments, an IED which performs the process 300 may be used to control an entire power system, a local power system (i.e. island or microgrid), and/or a plurality of islands within a power system. An island may be an electrical segment that is physically isolated from the remainder of the overall power system with its own generation and load.

The process 300 of FIG. 3 is initiated by determining 302 that a contingency breaker has opened, indicating a fault condition (i.e. over-generation condition). According to various embodiments, the contingency breaker may be a breaker to open or trip when the generated power of a power system exceeds the load threshold of the power system (i.e. during an over-generation condition). The contingency breaker may also be a module to detect a fault condition and send a signal.

The process 300 further includes calculating 304 the islands. For each island, the process 300 may calculate 304 the EG, the runback capacity (RC), the number of generators (NGen), and the DRM capacity of the generators. The EG may be determined by finding a difference between the generated power and the load threshold, where the generated power is greater than the load threshold. The information for determining the EG may be found from measuring power across the generator breakers, contingency breakers, and load breakers of the power system. The RC is the amount of power the generators are able to runback. Information for both the RC and the DRM may be received from user input.

According to one embodiment, upon calculating 304 the islands, the process 300 may separate the generators into two parent groups. The first parent group may be a set of generators for shedding that do not have a runback capacity or ability, and the second parent group may be a set of generators that do have a runback capacity. Further, according to the embodiment, the second parent group may be sub-divided into child groups for runback according to a priority during the group equal percentage runback process 330. A user may determine the priority of certain child groups for runback. The first parent group may be sub-divided into child groups for shedding according to an optimal selection algorithm during the optimal generator shedding process 320. In some embodiments, upon calculating 304 the islands, the process 300 may group generators such that certain generators are available for either shedding or runback. In various embodiments, a user may assert that certain generators of the plurality of generators are unavailable for runback, shedding, or both.

The process 300 also includes determining 306 whether the EG is greater than the sum of the DRM and the DB. The DB may be received by the process 300 as user input, or as input from one or more of the generators.

If it is determined 306 that the EG is less than or equal to the sum of the DRM and the DB, the process 300 may terminate 308. Alternatively, if it is determined 306 that the EG is greater than the sum of the DRM and the DB, the process 300 may proceed to determine a method for reducing the EG.

If it is determined 306 that the EG is greater than the sum of the DRM and the DB, the process 300 may determine 310 whether the EG is greater than the RC, and whether the NGen is greater than one. If it is determined 310 that either the EG is less than or equal to the RC or that the NGen is less than or equal to one, the process 300 may reduce the EG by running back generators. Specifically, if it is determined 310 that either the EG is less than or equal to the RC or that the NGen is less than or equal to one, the process 300 may reduce EG through a group equal percentage runback process 330. Alternatively, if it is determined 310 that both the EG is greater than the RC and the NGen is greater than one, the process 300 may reduce the EG by shedding generators. Specifically, if it is determined 310 that both the EG is greater than the RC and the NGen is greater than one, the process 300 may reduce the EG through an optimal generator shedding process 320.

If the EG is reduced through the optimal generator shedding process 320, it may be determined 306 thereafter that the EG is reduced to be less than or equal to the sum of the DRM and the DB, and the process 300 may subsequently terminate 308. Alternatively, after the EG is reduced through the optimal generator shedding process 320, it may be determined 306 that the EG still remains greater than the sum of the DRM and the DB, and the process 300 may again determine 310 a method for further reducing the EG. If the EG is reduced through the group equal percentage runback process 330, groups of generators are selected and runback until the EG is sufficiently reduced for the process 300 to terminate 338.

Figure 4:
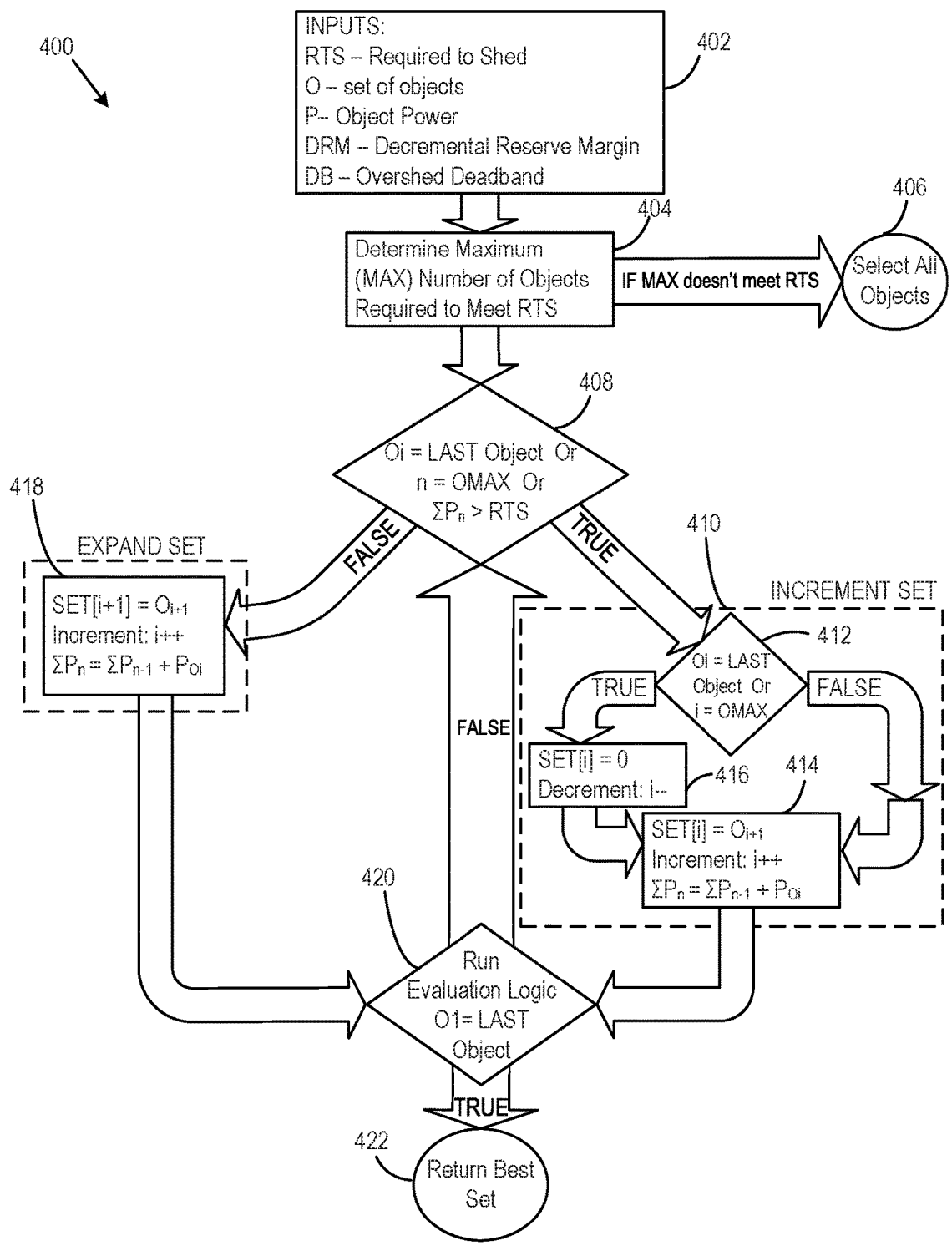
FIG. 4 is a flow chart for an optimal selection process for generator shedding in a power system, according to one embodiment.

The optimal generator shedding process 320 includes determining 322 whether to include the DRM. The DRM may be included if the RC is zero and the event is not closely timed (e.g., less than the settling time for the power system to recover or return to a steady state from a disturbance; the settling time for the power system after a disturbance is not known precisely). Upon determining 322 whether to include the DRM, the optimal generator shedding process 320 optimally selects 324 generators. One example of an approach to optimally select 324 generators is shown in FIG. 4 and discussed below with reference to the same. The optimal generator shedding process 320 further includes shedding 326 the optimally selected generators. The optimal generator shedding process 320 may effectively shed 326 optimally selected generators by opening various breakers between the optimally selected generators and their respective and/or collective loads, thereby cutting the flow of power from the generators to the loads. The EG, RC, NGen, and DRM (if necessary) are recalculated 328 to account for (remove from consideration) the generators selected for shedding 326.

The group equal percentage runback process 330 includes determining 332 whether the runback selected (RS) is greater than or equal to the EG. RS is the RC of a selected generator group or groups. If it is determined 332 that the RS is greater than or equal to the EG, the group equal percentage runback process 330 calculates 336 a runback set point (amount of power to runback) for each given generator of the selected generator group or groups. The runback set point for each generator of the selected generator group or groups may be set according to a proportion of RC within the generator. According to various embodiments, the runback set point may be calculated 336 according to Equation 1.

$$P_g = EG(RC_g/RC) \qquad \text{Equation 1}$$

In Equation 1, $P_g$ is the current power output of a given generator.

Once the runback set point is calculated 336, the process 300 may send a signal or command to the pertinent generators to runback. Further, once the runback set point is calculated 336, the process 300 terminates 338.

Alternatively, if the group equal percentage runback process 330 determines 332 that the RS is less than the EG, the group equal percentage runback process 330 creates 334 a generator group for runback, selects the generator group, and augments the RS accordingly. The process 300 may create 334 generator groups such that each generator group comprises a unique set of one or more of the plurality generators. Further, the process 300 may group each generator such that each generator of the power system belongs to a single generator group of the plurality of generator groups. Specifically, the RS is augmented by the runback capacity of the next generator group RCS. Upon incrementing RS, the group equal percentage runback process 330 returns to determine 332 whether the updated RS is greater than or equal to the EG.

FIG. 4 is a flow chart of an optimal selection algorithm 400 for generator shedding. In a power system (such as the power system 100 of FIG. 1), balancing the generated power with the load threshold or load demand is important for avoiding disruptions in delivery of power. The optimal selection algorithm 400 may be implemented to select generators of a power system (such as the power system 100 of FIG. 1) for shedding.

The optimal selection algorithm 400 may be implemented on an IED or other computing device (such as the power controller 200 of FIG. 2). According to various embodiments, an IED that performs the algorithm 400 may be used to control an entire power system, a local power system (i.e. island or microgrid), and/or a plurality of islands within a power system. An island may be an electrical segment that is physically isolated from the remainder of the overall power system with its own generation and load. In one example, the optimal selection algorithm 400 may be implemented as part of a process for managing power production in a power system (such as the process 300 of FIG. 3), which may reduce power by shedding generators, running back generators, or a combination of the two. In one embodiment, the optimal selection algorithm 400 may be used for the optimal selection 324 of generators in the optimal generator shedding process 320 of FIG. 3. The optimal selection algorithm 400 may be implemented on a device that communicates with and/or controls various generator breakers, contingency breakers, load breakers, relays, switches, controllers, and/or sensors of a power system.

The optimal selection algorithm 400 may determine an optimal set of generators for shedding from the set of all generators (G) such that the optimal set of generators produces an amount of power that substantially approximates a requested amount of power to shed. Specifically, the optimal selection algorithm 400 determines candidate sets (SETs) of generators to shed and evaluates different combinations of generators (e.g., permutations) within those SETs until an optimal set of generators to shed from the set of all generators G is determined. In one embodiment, the optimal selection algorithm 400 may determine an optimal set of generators to shed by determining a maximum set of generators (MAX set) to meet a requirement to shed (RTS) and evaluating combinations of SETs of generators. In other words, the MAX set is a worst-case scenario. The number of generators in the MAX set is OMAX. The MAX set may be a set of objects that serves as a maximum reference, such that candidate SETs for shedding must have fewer or equal members than the MAX set (e.g., the number of generators in each SET is less than or equal to OMAX). According to various embodiments, the optimal SET may be the set of generators that best approximates the RTS.

The optimal selection algorithm 400 is initiated by receiving 402 various inputs. According to FIG. 4, the inputs may comprise a value for the RTS, a list or set of objects (the plurality of generators in the set G of the power system), the power (P) of each generator of the plurality of generators, a DRM, and an over-shed DB. The RTS value may be calculated as the difference between the EG of the power system and the DB. In some embodiments, the RTS may also consider the DRM. In various embodiments, the DRM and/or DB may be defined by user input, or obtained from the plurality of generators. Further, P may be measured from sensors, breakers, and/or controllers of the generators of the power system.

According to various embodiments, the optimal selection algorithm 400 may include a contingency breaker and a communications interface. The contingency breaker may be a breaker or signal to allow the optimal selection algorithm 400 to receive 402 various inputs and perform actions. The contingency breaker may be in communication with the communications interface to receive over-generation condition signals and trip based on user preferences and/or predetermined criteria (e.g., an EG threshold, the shedding availability of various generators, types of connections to the utility, etcetera). Further, the communications interface may send a signal to the power system indicating that the contingency breaker has tripped (i.e. that the optimal selection algorithm 400 has initiated).

The optimal selection algorithm 400 includes determining 404 OMAX of a MAX set that meets the RTS. A MAX set may be a set of objects that serves as a maximum reference such that candidate sets (O) for shedding must have fewer or equal members than the MAX set. OMAX may be the maximum number of generators to meet the RTS. If the collective P of all objects in the system (e.g. all generators in the power system) is less than the RTS, the optimal selection algorithm 400 selects 406 all objects. According to various embodiments, the objects may be generators, and the selected objects may be the generators to shed. In one embodiment, the MAX set is determined 404 by ordering all objects in the system from smallest to largest according to their respective P, and counting the number of objects while summing their individual Ps until the collective P is greater than or equal to the RTS. OMAX is then defined as the number of objects in the MAX set. For example, all objects (e.g., the set of all generators G) in the system may comprise generators A, B, and C, where a first object in the system is A, a second object in the system is B, and a third object in the system is C. In the example, the power of generator A (P(A), or P(first object in the system)) is 10 MW, P(B) (or P(second object in the system)) is 5 MW, and P(C) (or P(third object in the system)) is 15 MW. Further, the RTS is 15 MW. To determine 404 the MAX set and OMAX, the generator objects G would be ordered as generators B, A, then C. In the example, OMAX would be two (because 5 MW plus 10 MW is greater than or equal to 15 MW), and the MAX set would comprise generators B and A. Further, the collective P in the MAX set is 15 MW. Since the collective P in the MAX set is not less than the RTS, the optimal selection algorithm 400 does not select 406 all objects in the system for shedding.

Once the MAX set and OMAX are determined 404, the optimal selection algorithm 400 includes determining the optimal set (from all objects G) to meet the RTS. According to various embodiments, the optimal set of objects may be the smallest number of generators from all generators G in the system to meet the RTS. In some applications, the size of the optimal set is the same as OMAX. Further, in some applications, the optimal set is the MAX set. The optimal selection algorithm 400 determines the optimal set by evaluating all combinations of candidate sets (e.g., permutations), where the number of objects (n) in each candidate set is less than or equal to OMAX. In other embodiments, an optimal selection algorithm may determine the optimal set by evaluating all permutations of candidate sets.

The optimal selection algorithm 400 may define a first candidate set O. Initially O may only include the first object (e.g. generator A) of all objects in the system. The optimal selection algorithm 400 may also define a last object (LAST object) of all objects in the system. Accordingly, LAST object would be the third object in the system (e.g., generator C) and O would initially include only generator A.

The optimal selection algorithm 400 may evaluate different combinations of generators in the candidate set O either by expanding 418 the candidate set O, by incrementing 410 the candidate set O, or by an iterative combination of the two until an optimal set is determined. Expanding 418 the candidate set O may include adding another object (e.g., from the objects in the system) to the candidate set O. Incrementing 410 the candidate set O may include changing objects in the candidate set O for other objects. Further, during a single iteration, the optimal selection algorithm 400 may decide 408 whether to expand 418 or to increment 410 the candidate set O by evaluating the current object (O[i]) of the candidate set O, the size of the candidate set O, or the sum of the P of all objects in the candidate O ($\Sigma P_n$). Specifically, if the optimal selection algorithm 400 evaluates that O[i] is the LAST object, that n is equal to OMAX, or that $\Sigma P_n$>RTS, the optimal selection algorithm 400 would decide 408 to increment 410 the candidate set O. Otherwise, the optimal selection algorithm 400 would decide 408 to expand 418 the candidate set O.

During the first iteration, O[i] would be generator A, n would be one, $\Sigma P_n$ would be 10 MW, LAST object would be generator C (e.g. the third object of all objects in the system), OMAX would be two, and the RTS would be 15 MW. In the example, during the first iteration, the optimal selection algorithm 400 would evaluate that O[i] is not generator C (and therefore not LAST object), that n is not OMAX, and that $\Sigma P_n$ is not greater than the RTS. Accordingly, the optimal selection algorithm 400 would decide 408 to expand 418 the candidate set O.

The optimal selection algorithm 400 may expand 418 the candidate set O by adding another object from all objects in the system to the candidate set O, incrementing n, and recalculating $\Sigma P_n$. In the example, the optimal selection algorithm 400 would expand 418 the candidate set O by adding generator B (e.g. the second object of all objects in the system) to the candidate set O, incrementing n such that n equals two, and calculating $\Sigma P_n$ where $\Sigma P_n$ would now equal 15 MW.

If the optimal selection algorithm 400 decides 408 to increment 410 the candidate set O, it may do so by removing 416 an object from the candidate set O and exchanging 414 a remaining object from the O for another object from all objects in the system. Alternatively, the optimal selection algorithm 400 may increment 410 the candidate set O by exchanging the ith element of the candidate set O for another object from all objects in the system without reducing the size of the candidate set O. The optimal selection algorithm 400 may determine how to increment 410 the candidate set O by evaluating 412 O[i] and n. Specifically, the optimal selection algorithm 400 may evaluate 412 if O[i] is the LAST object or if n is OMAX. If either O[i] is the LAST object or n is OMAX, then the optimal selection algorithm 400 would decide to increment 410 the candidate set O by removing 416 an object from the candidate set O and exchanging 414 a remaining object from the candidate set O for another object from all objects in the system. Alternatively, if O[i] is not LAST object and n is not OMAX, the optimal selection algorithm 400 would decide to increment 410 the candidate set O by exchanging the ith element of the candidate set O for another object from all objects in the system without reducing the size of the candidate set O. According to FIG. 4, the optimal selection algorithm 400 may remove 416 an object from the candidate set O by setting O[i] to zero and decrementing n by one unit. Further, according to FIG. 4, the optimal selection algorithm 400 may exchange the ith element of the candidate set O for another object from all objects G in the system by setting O[i]=the i+1 element of all objects in the system, incrementing n by one unit, and recalculating $\Sigma P_n$.

Once the optimal selection algorithm 400 has iterated through a variation (e.g., permutation) of the candidate set O (by either expanding 418 or incrementing 410 the candidate set O), the optimal selection algorithm 400 may run 420 evaluation logic to determine if the candidate set O is the current optimal set. According to one embodiment, running 420 evaluation logic includes evaluating the Boolean equation of FIG. 6.

Upon running 420 evaluation logic, the optimal selection algorithm 400 determines whether O[1] is LAST object. If O[1] is LAST object, the optimal selection algorithm 400 returns 422 the current optimal set. Otherwise, the optimal selection algorithm 400 decides 408 to either expand 418 the O or increment 410 the candidate set O for another iteration.

Figure 5:
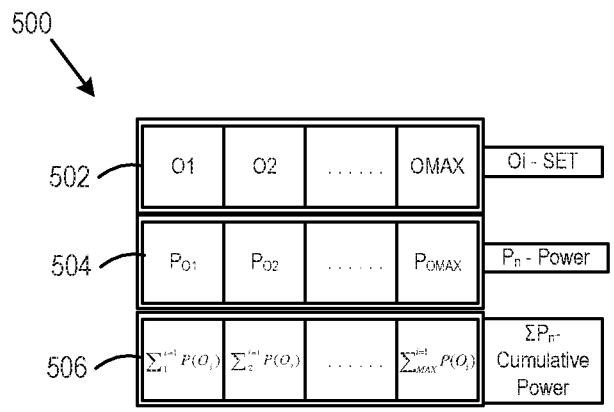
FIG. 5 is a list of data structures for the optimal selection process of FIG. 4, according to one embodiment.

FIG. 5 is a list 500 of data structures. According to various embodiments, the list 500 of data structures may correspond to various sets or lists of the optimal selection algorithm 400 of FIG. 4. According to FIG. 5, the list 500 of data structures comprises a candidate set O of objects 502, corresponding P values 504, and a list of cumulative P values 506. In one embodiment, the objects of the candidate set O of objects 502 are generators of a plurality of generators of a power system. Further, according to the embodiment, the P values of the list of P values 504 are the power output of corresponding generator objects (O). Also, according to the embodiment, the cumulative P values of the list of cumulative P values 506 are summations of power outputs of sets of generator objects.

Figure 6:
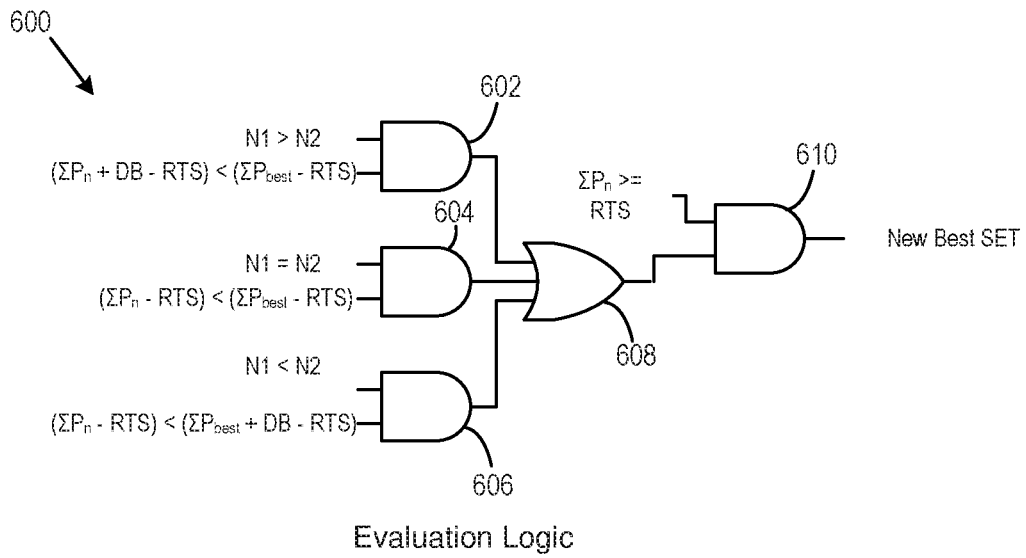
FIG. 6 is a gate level schematic diagram of a Boolean equation, according to one embodiment.

FIG. 6 is a gate level schematic diagram 600 of a Boolean equation. According to various embodiments, the diagram 600 is for the evaluation logic of FIG. 4 that the optimal selection algorithm 400 is to run 420. According to various embodiments, the diagram 600 is for determining a best set of two sets of generators. In various embodiments, the best set of generators is an optimal set of generators to shed whose power substantially approximates a requested shedding amount.

The Boolean equation of the diagram 600 may consider a first set and second set of generators, where the first set is a new set and the second set is a saved set. Specifically, the Boolean equation of the diagram 600 may consider the number of generators in the first set N1 and the number of generators in the second set N2, as well as the sum of the power of the generators in the first set $\Sigma P_n$ and the sum of the power of the generators in the second set $\Sigma P_{best}$. The second set may be a current (saved) best set.

The Boolean equation of the diagram 600 may also consider the DB and RTS values. The RTS value may be an amount of power to shed such that the EG of a power system is reduced to a desired value.

According to FIG. 6, the diagram 600 comprises four AND gates (AND$_1$ 602, AND$_2$ 604, AND$_3$ 606, and AND$_4$ 610) and one OR gate (OR$_1$ 608). Each AND gate 602, 604, 606, 610 receives two inputs and outputs the Boolean AND function of the two inputs. OR$_1$ 608 receives three inputs and outputs the Boolean OR function of the three inputs.

According to the diagram 600, AND$_1$ 602 receives TRUE as the first input if N1 is greater than N2. Otherwise, AND$_1$ 602 receives FALSE as the first input. Further, AND$_1$ 602 receives TRUE as the second input if the sum of $\Sigma P_n$ with the difference of the DB and the RTS is less than the difference of $\Sigma P_{best}$ and the RTS. Otherwise, AND$_1$ 602 receives FALSE as the second input.

According to the diagram 600, AND$_2$ 604 receives TRUE as the first input if N1 is equal to N2. Otherwise, AND$_2$ 604 receives FALSE as the first input. Further, AND$_2$ 604 receives TRUE as the second input if the difference of $\Sigma P_n$ and the RTS is less than the difference of $\Sigma P_{best}$ and the RTS. Otherwise, AND$_2$ 604 receives FALSE as the second input.

According to the diagram 600, AND$_3$ 606 receives TRUE as the first input if N1 is less than N2. Otherwise, AND$_3$ 606 receives FALSE as the first input. Further, AND$_3$ 606 receives TRUE as the second input if the difference of $\Sigma P_n$ and the RTS is less than the sum of $\Sigma P_{best}$ with the difference of the DB and the RTS. Otherwise, AND$_3$ 606 receives FALSE as the second input.

According to the diagram 600, OR$_1$ 608 receives the outputs of AND$_1$ 602, AND$_2$ 604, and AND$_3$ 606 as inputs. If any of AND$_1$ 602, AND$_2$ 604, and AND$_3$ 606 yield a TRUE output, OR$_1$ 608 will output TRUE. Otherwise, OR$_1$ 608 will output FALSE.

Effectively, AND$_1$ 602, AND$_2$ 604, AND$_3$ 606, and OR$_1$ 608 determine whether the first set (new set) yields a closer approximation of power to the RTS than the second set (current best set).

According to the diagram 600, AND$_4$ 610 receives TRUE as the first input if $\Sigma P_n$ is greater than or equal to the RTS. Otherwise, AND$_4$ 610 receives FALSE as the first input. Further, AND$_4$ 610 receives TRUE as the second input if the output of OR$_1$ 608 is TRUE. Otherwise, AND$_4$ 610 receives FALSE as the second input.

Effectively, AND$_4$ 610 determines whether the first set (new set) meets the RTS (i.e. if the first set produces sufficient power to meet the RTS). If the first set meets the RTS and yields a closer approximation of power to the RTS than the second set (current best set), then the first set is saved as the current best set. Otherwise, the second set remains as the current best set.

The evaluation logic of the diagram 600 evaluates equation 2, where && represents the Boolean AND function, || represents the Boolean OR function, and F is the outcome of the evaluation logic of the diagram 600. If F is TRUE, then the first set (new set) is saved as the current best set.

$$\{[(N1>N2)\&\&[(\Sigma P_n+DB-RTS)<(\Sigma P_{best}-RTS)]]||$$
$$[(N1=N2)\&\&[(\Sigma P_n-RTS)<(\Sigma P_{best}-RTS)]]||$$
$$[(N1<N2)\&\&[(\Sigma P_n-RTS)<\text{best}(\Sigma P_{best}+DB-RTS)]]\}\&\&[\Sigma P_n]=F \quad \text{Equation 2}$$

EXAMPLE EMBODIMENTS

Example 1

A system (e.g., an IED) for managing an electric power delivery system, comprising: a communications interface to receive signals from the electric power delivery system (e.g., one or more breakers including a contingency breaker, one or more generator breakers, and/or one or more load breakers, and/or one or more sensors) and to send signals to modify generation of electric power of a plurality of generators of the electric power delivery system by modifying generator shedding and/or generator runback; one or more processors to: determine a plurality of generator groups, each generator group comprising a unique set of one or more of the plurality of generators, and each generator belonging to a single generator group of the plurality of generator groups; determine EG by the electric power delivery system, based on the load information from a signal from the electric power delivery system (e.g., the contingency breaker, a generator breaker, and/or a load breaker); if EG is less than or equal to RC: select a generator group of the plurality of generator groups according to a predetermined ordering; and until EG is greater than a runback selected (RS), where RS is a sum of a runback capacity of a group (RC$_g$) for selected groups: select a next generator group of the plurality of generator groups according to the predetermined ordering; and set RS equal to itself plus the RC$_g$ for the next selected generator group; if EG is less than or equal to RS: set a runback set point for each generator of the selected generator group; and send a signal by the communication interface to runback each generator of the selected generator groups according to the runback set point.

Example 2

A computer-implemented method for managing an electric power delivery system comprising a plurality of generators, comprising: determining a plurality of generator groups, each generator group comprising a unique set of one or more of the plurality of generators, and each generator belonging to a single generator group of the plurality of generator groups; determining EG by the electric power delivery system, based on load information received through a signal from the electric power delivery system (e.g., one or more breakers including a contingency breaker, one or more generator breakers, one or more load breakers, and/or one or more sensors); if EG is less than or equal to RC: selecting a generator group of the plurality of generator groups according to a predetermined ordering; and until EG is greater than a runback selected (RS), where RS is a sum of a runback capacity of a group (RC$_g$) for selected groups: selecting a next generator group of the plurality of generator groups according to the predetermined ordering; and setting RS equal to itself plus the RC$_g$ for the next selected generator group; if EG is less than or equal to RS: setting a runback set point for each generator of the selected generator group according to a proportion of runback capacity within the generator; and sending a signal by the communication interface to runback each generator of the selected generator groups according to the runback set point.

This disclosure has been made with reference to various embodiments, including the best mode. However, those skilled in the art will recognize that changes and modifications may be made to the embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims:

The invention claimed is:

1. A system for managing an electric power delivery system, comprising:
   a communications interface to receive signals from the electric power delivery system and to send signals to modify generation of electric power of a plurality of generators;
   one or more processors to:
      determine a plurality of generator groups, each generator group comprising a unique set of one or more of the plurality of generators;
      determine excess generation (EG) by the electric power delivery system, based on load information from a signal from the electric power delivery system;
      if EG is less than or equal to runback capacity (RC) of the plurality of generators:
         select a generator group of the plurality of generator groups according to a predetermined ordering; and
         until EG is greater than a runback selected (RS), where RS is a sum of a runback capacity of a group (RC$_g$) for selected groups:
            select a next generator group of the plurality of generator groups according to the predetermined ordering; and
            set RS equal to itself plus the RC$_g$ for the next selected generator group;
         if EG is less than or equal to RS:
            set a runback set point for each generator of the selected generator group; and
            send a signal by the communications interface to runback each generator of the selected generator group according to the runback set point.

2. The system of claim 1, wherein the one or more processors are further to:
if EG is greater than RC of the plurality of generators:
determine a set of generators of the plurality of generators to shed; and
send a signal to disconnect the set of generators from the electric power delivery system.

3. The system of claim 2, wherein the set of generators of the plurality of generators to shed is determined according to an optimal selection algorithm.

4. The system of claim 3, wherein the optimal selection algorithm comprises:
evaluating permutations of candidate sets of generators from the plurality of generators to determine an optimal set of generators to shed.

5. The system of claim 3, wherein the optimal selection algorithm comprises:
determining a maximum number (MAX) of generators to meet a requirement to shed; and
evaluating permutations of candidate sets of generators from the plurality of generators to determine an optimal set of generators to shed,
wherein the number of generators in each permutation of candidate sets is less than or equal to MAX.

6. The system of claim 1, further comprising a contingency breaker in communication with the communications interface to receive overload condition signals and trip based on user preferences and send a signal to the system.

7. The system of claim 1, further comprising a contingency breaker configured to trip and send a signal to the system based on predetermined criteria.

8. The system of claim 1, further comprising a plurality of intelligent electronic devices (IEDs) in communication with the system, each IED corresponding to a generator of the plurality of generators to receive a signal from the system and to provide a signal to the generator to shed the generator or runback the generator according to the runback set point.

9. The system of claim 1, wherein the runback set point for each given generator of the selected generator group is set according to $P_g-EG(RC_g/RC)$, where $P_g$ is the power of the given generator.

10. The system of claim 1, wherein the runback set point for each generator of the selected generator group is set according to a proportion of RC within the generator.

11. A method for managing an electric power delivery system comprising a plurality of generators, the method comprising:
determining a plurality of generator groups, each generator group comprising a unique set of one or more of the plurality of generators;
determining excess generation (EG) by the electric power delivery system, based on load information received through a signal from the electric power delivery system;
if EG is less than or equal to runback capacity (RC) of the plurality of generators:
selecting a generator group of the plurality of generator groups according to a predetermined ordering; and
until EG is greater than a runback selected (RS), where RS is a sum of a runback capacity of a group ($RC_g$) for selected groups:
selecting a next generator group of the plurality of generator groups according to the predetermined ordering; and
setting RS equal to itself plus the $RC_g$ for the next selected generator group;
if EG is less than or equal to RS:
setting a runback set point for each generator of the selected generator group according to a proportion of RC within the generator; and
sending a signal by a communication interface to runback each generator of the selected generator group according to the runback set point.

12. The method of claim 11, further comprising:
if EG is greater than RC of the plurality of generators:
determining a set of generators of the plurality of generators to shed; and
sending a signal to disconnect the set of generators from the electric power delivery system.

13. The method of claim 12, wherein determining the set of generators to shed comprises an optimal selection algorithm including evaluating permutations of candidate sets of generators from the plurality of generators to determine an optimal set of generators to shed.

14. The method of claim 12, wherein determining the set of generators comprises:
determining a maximum number (MAX) of generators to meet a requirement to shed; and
evaluating permutations of candidate sets of generators from the plurality of generators to determine an optimal set of generators to shed,
wherein the number of generators in each permutation of candidate sets is less than or equal to MAX.

15. The method of claim 11, further comprising:
receiving at a contingency breaker one or more overload condition signals; and
tripping the contingency breaker based on user preferences and the one or more overload condition signals.

16. The method of claim 11, wherein the runback set point for each given generator of the selected generator group is set according to $P_g-EG(RC_g/RC)$, where $P_g$ is the power of the given generator.

17. The method of claim 11, wherein the runback set point for each generator of the selected generator group is set according to the proportion of RC within the generator.

18. A system for managing generation runback on a microgrid, comprising:
a contingency breaker to receive an over-generation condition signal indicating that the microgrid is generating excess power beyond power being consumed collectively by loads connected to the microgrid, wherein the contingency breaker trips based on user preferences and the over-generation condition signal;
an intelligent electronic device (IED) in communication with the contingency breaker and a plurality of generators on the microgrid, the IED to:
determine a plurality of generator groups, each generator group comprising a unique set of one or more of the plurality of generators;
calculate excess generation (EG) on the microgrid;
if EG is less than or equal to a runback capacity (RC) of the plurality of generators:
select a generator group of the plurality of generator groups; and
until EG is greater than a runback selected (RS), where RS is a sum of a runback capacity of a group ($RC_g$) for selected groups:
select a next generator group of the plurality of generator groups according to a predetermined ordering; and
set RS equal to itself plus the $RC_g$ for the next selected generator group;

if EG is less than or equal to RS:
set a runback set point for each generator of the selected generator group according to a proportion of RC within the generator; and
send a signal by a communication interface to runback each generator of the selected generator group according to the runback set point.

19. The system of claim 18, wherein the IED is further to:
if EG is greater than RC of the plurality of generators:
determine a set of generators of the plurality of generators to shed; and
send a signal to disconnect the set of generators from an electric power delivery system.

20. The system of claim 19, wherein the IED determines the set of generators that has the fewest generators, and wherein the signal to disconnect the set of generators comprises shedding the set with the fewest generators.

21. The system of claim 19, wherein the signal to disconnect the set of generators comprises sending a signal to a breaker to trip the breaker to disconnect a given generator from the microgrid.

22. The system of claim 18, wherein the runback set point for each given generator of the selected generator group is set according to $P_g - EG(RC_g/RC)$, where $P_g$ is the power of the given generator.

23. The system of claim 18, wherein the runback set point for each generator of the selected generator group is set according to the proportion of RC within the generator.

* * * * *